Figure 1:
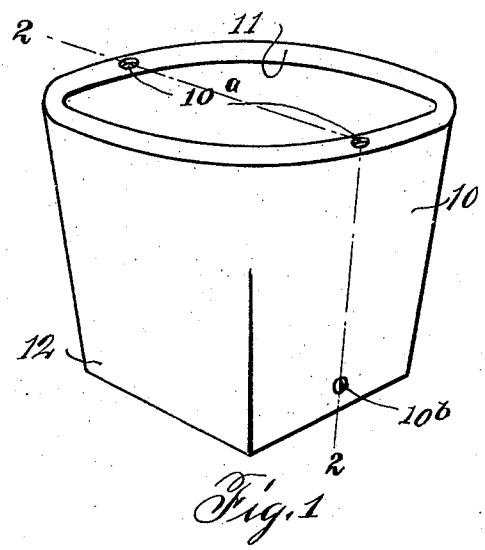

R. ROUSE, Jr.
FIRE POT.
APPLICATION FILED FEB. 2, 1910.

986,864.

Patented Mar. 14, 1911.

Witnesses:
Frank L. Stubbs
Arthur B. Darnell

Richard Rouse Jr. Inventor.
By his Attorney
W. B. Hutchinson

UNITED STATES PATENT OFFICE.

RICHARD ROUSE, JR., OF ELIZABETH, NEW JERSEY, ASSIGNOR TO BOYNTON FURNACE COMPANY, OF NEW YORK, N. Y., A CORPORATION OF NEW JERSEY.

FIRE-POT.

986,864.   Specification of Letters Patent.   Patented Mar. 14, 1911.

Application filed February 2, 1910. Serial No. 541,420.

*To all whom it may concern:*

Be it known that I, RICHARD ROUSE, Jr., of the city of Elizabeth, county of Union, and State of New Jersey, have invented a new and useful Improvement in Fire-Pots, of which the following is a full, clear, and exact description.

My invention relates to improvements in fire pots, and more especially to fire pots such as are used for steam and hot water furnaces, although the invention is applicable to any place in which a fire pot to contain the fuel, is used.

My present invention relates more especially to improvements in a double wall fire pot in which the water circulates between the walls, and more particularly to fire pots of this class in which the upper portion of the fire pot is essentially circular and the bottom essentially square. It has been found in practice that pots of this shape are more easily kept clean, and that better heating results are obtained. In structures of this sort, however, where a water body is maintained between the walls of the fire pot, the lower edges are usually rather thick, and sometimes there is a little clogging around the edge of the pot and a consequent loss of efficiency. I have found that by beveling the lower edge so that the bevel will come on the inner part and the thinnest part at the bottom, I obtain a distinct advantage, as the course of ashes and refuse naturally follows down the general trend of the inner wall, and will therefore leave an air space along the lower edge of the pot between this ash line and the beveled wall, through which space the air will enter freely and thus cause the fire to be maintained cleanly and effectively up to the very wall of the pot.

Another object of my invention is to construct the fire pot so that it can be readily cast and in such a way that the inner wall will have a plane surface while the lower part will be beveled away on the inner side so that the beveled or cut away portion will fall without the line of the plane surface.

Reference is to be had to the accompanying drawings forming a part of this specification, in which similar reference characters indicate corresponding parts in all the views.

Figure 2:
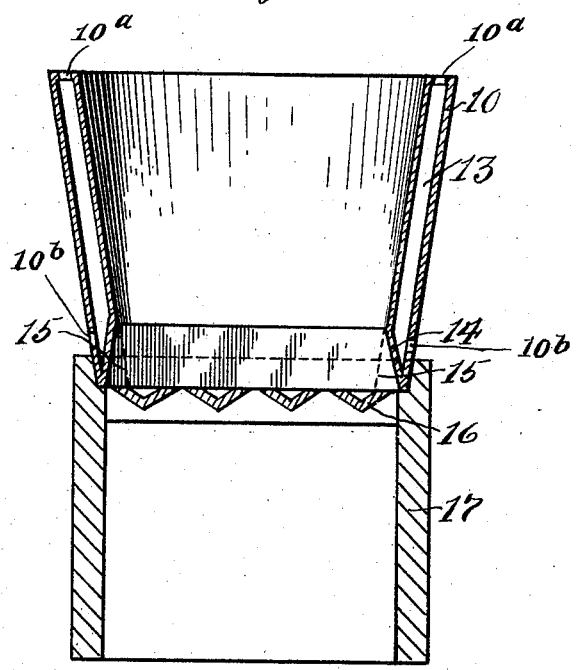

Figure 1 is a perspective view of a fire pot showing my improvements, and Fig. 2 is a vertical section of the fire pot on the line 2—2 of Fig. 1, and showing a common means of supporting it.

The fire pot 10 is of the double walled variety so that the water can be maintained in the chamber 13 thereof, and it is preferably circular or oval in cross section at the top as shown at 11, and rectangular or nearly so at the bottom, as shown at 12. The reason for having the upper part of the pot essentially circular and the lower part essentially rectangular, is that most boiler constructions are generally circular in cross section, and therefore the sections used can fit on nicely over the circular top of the fire pot, while by having the bottom portion rectangular, clogging and the accumulation of clinkers is largely prevented, and the fire spreads out at the bottom and burns more freely and naturally. Without regard to the super-structure, this shape is very advantageous for the reasons stated, and the free burning and clogging is further prevented by the beveled structure hereinbelow referred to. On the lower edge and inside the fire pot is, however, beveled or thinned as shown at 14, and when a fire is maintained in the pot, the ash-line will approximately follow the inner wall of the pot and drop as shown by dotted lines at 15 so as to leave an air space between said ash-line and the beveled wall. The bottom of the pot can rest on any suitable grate such as 16, which I have shown carried by a support 17, but the form of grate and support is incidental, and merely shows a means of carrying the fire pot. As a matter of fact the fire pot can be applied to any preferred form of furnace structure, may be incorporated as a part of the structure, and may rest on any approved support or grate, the essential thing being to have the lower edge beveled as shown with the bevel on the inner part so that an air space is provided between the ash-line and the furnace wall. This construction while simple, has been tried out, and I find that a distinctly improved result is obtained as the fuel burns much more cleanly and effectively by reason of this structure.

The fire pot should, of course, be provided with suitable water connections $10^a$ and $10^b$, or their equivalent, to provide for circulation, these not being claimed as novel in this application.

Obviously the upper part of the pot can be more or less oval or elliptical and the lower part be squared or flattened without being a perfect square, without departing from the principle of the invention, and in fact the beveled scheme can be applied to the pot without regard to its particular cross section.

Having thus fully described my invention, I claim as new and desire to secure by Letters Patent:—

1. As an improved article of manufacture, a fire pot having its upper part essentially circular, its lower part essentially rectangular, and having a beveled or inclined portion extending from the inner surface to the outer supporting portion of the pot bottom.

2. A fire pot having its upper portion essentially circular, its lower portion essentially square, a double wall to contain liquid, and a beveled lower portion, said bevel extending downwardly and outwardly from the inner surface of the pot.

RICHARD ROUSE, Jr.

Witnesses:
WILLIAM RITCHIE,
W. S. DICKINSON.

---

Copies of this patent may be obtained for five cents each, by addressing the "Commissioner of Patents Washington, D. C."